Patented Oct. 21, 1952

2,614,914

UNITED STATES PATENT OFFICE 2,614,914

DIESEL FUEL CONTAINING DI-TERTIARY ALKYL SULFIDES AS IGNITION PROMOTERS

Lawrence T. Eby, Roselle, N. J., assignor to Standard Oil Development Company, a corporation of Delaware No Drawing. Application June 4, 1946, Serial No. 674,373

3 Claims. (Cl. 44—57)

This invention relates to a new type of additive for improving the properties of hydrocarbon oils, particularly lubricating oils and diesel fuels.

The new additive of the present invention is a dialkyl sulfide having tertiary alkyl radicals of at least 8, and most suitably from 8 to 25, carbon atoms in each alkyl group, such alkyl groups being connected by at least 2, and preferably from 2 to 4, sulfur atoms. The new type of additive, when dissolved in a mineral lubricating oil, imparts to such oil the property of resisting corrosion of metal surfaces, particularly the copper-lead and cadmium-silver alloy bearings now commonly employed in automotive engines. Such oil also has the property of resisting deterioration by oxidation, and it resists sludge formation, thus providing for a cleaner engine condition. The form in which the sulfur of the additive is held in chemical combination makes it possible to introduce an unusually large proportion of sulfur into the oil without at the same time causing the oil to stain copper, bronze and other metal surfaces with which it comes into contact. In these respects many of the compounds of the present invention have been found to be superior to the aliphatic mercaptans described in my U. S. Patent 2,382,700.

In somewhat larger quantities the additives of the present invention impart load carrying properties to the oil, enabling the same to be used as an extreme pressure lubricant. When the dialkyl sulfides contain large amounts of sulfur, as in the hexasulfides and octasulfides, they may be conveniently employed in cutting oils and the like.

The compounds herein disclosed are likewise useful as diesel "dopes," for increasing the cetane number of diesel fuels.

The tertiary alkyl polysulfides of the present invention are generally employed in unsubstituted form, but they are likewise useful for the purposes indicated when one or more of the hydrogen atoms of the alkyl groups is replaced by substituents, such as carboxyl, hydroxyl, alkoxy, nitro, keto, amino, aldehydo, cyano, cyanate, thiocyanate, isothiocyanate, amido, sulfo, sulfate, thiophosphate, phosphonate, sulfonate or ester groups, metal substituted carboxyl and hydroxyl groups, halogen atoms, and the like.

The di-tertiary-alkyl disulfides are most conveniently prepared by the oxidation of a tertiary mercaptan, for example, with oxygen, a halogen, or sulfur. The tertiary mercaptans may conveniently be prepared by reacting a tertiary olefin with hydrogen sulfide in the presence of a Friedel-Crafts type catalyst, as described more particularly in the co-pending application of Mikeska and Eby, Serial Number 512,776, filed December 3, 1943, now abandoned. The tertiary alkyl disulfides are most readily prepared by the above methods. The trisulfides may be prepared by reacting the tertiary mercaptan with sulfur or with sulfur dichloride, or by reacting the disulfide with sulfur. Similarly, tetrasulfides may be prepared by reacting the tertiary mercaptan with sulfur monochloride or with sulfur, or by reacting the trisulfide with sulfur. Still higher sulfides may be prepared by using larger quantities of the sulfur halides in the reaction with the mercaptan or by reacting the lower sulfides with additional sulfur. All of the above-described reactions may take place without a solvent, or by the use of a suitable solvent, such as chloroform. Loosely combined sulfur in the products may be removed by means of a "sweetening" or sulfur dissolving agent, e. g., an ammonium sulfide solution. Numerous examples will be given below in which methods for the preparation of these compounds will be described in detail.

Example 1.—Di-tert.-octyl trisulfide 46 g. (1 mol.) of tert.-octyl mercaptan (prepared by reacting diisobutylene with $H_2S$) and 200 cc. of chloroform were placed in a glass flask with stirrer, return condenser and dropping funnel. 51.5 g. (0.5 mol) of $SCl_2$ was added dropwise at 25–45° C. The mixture was heated under reflux for two hours, after which the solvent was stripped off by distillation, and all volatile constituents were removed at 2 mm. pressure over a boiling water bath. The clear light yellow liquid residue weighed 152.4 g. and contained (by Parr bomb analysis) 30.42% S and 0.20% Cl, corresponding to the formula $C_8H_{17}$—$S_{3.1}$—$C_8H_{17}$.

Example 2.—Sweetened di-tert.-octyl trisulfide

The procedure of Example 1 was repeated, but after refluxing the chloroform solution was "sweetened" by stirring twice with an ammonium sulfide solution prepared from 150 cc. of concentrated ammonium hydroxide and 10 g. of $H_2S$. The chloroform layer was washed with water, dried over anhydrous $K_2CO_3$, and stripped of solvent and volatile constituents at 100° C. and 2 mm. pressure. The light yellow liquid residue weighed 138.5 g. and contained 30.68% S and 0.26% Cl, corresponding to the formula

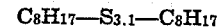

$C_8H_{17}$—$S_{3.1}$—$C_8H_{17}$

Example 3.—Di-tert.-octyl tetrasulfide 146 g. (1 mol) of tert.-octyl mercaptan and 200 cc. of chloroform were placed in a glass flask with stirrer, return condenser and dropping funnel. 67.5 g. (0.5 mol) of $S_2Cl_2$ was added dropwise at 25–41° C. The mixture was then heated under reflux for 2 hours. The solvent was stripped off by distillation, finally removing all volatile constituents at 2 mm. pressure over a boiling water bath. The clear yellow liquid residue weighed 168.1 g. and contained 36.15% S and 0.85% Cl, corresponding to the formula $$C_8H_{17}—S_4—C_8H_{17}$$

*Example 4.—Sweetened di-tert.-octyl tetrasulfide*

The procedure of Example 3 was repeated, but after refluxing the chloroform solution was sweetened by stirring twice with an ammonium sulfide solution, as in Example 2. The chloroform solution was washed with water, dried over anhydrous $K_2CO_3$, and stripped of solvent and volatile constituents at 100 cc. and 2 mm. pressure. The light yellow liquid residue weighed 154.9 g. and contained 34.45% S and 0.67% Cl, corresponding to the formula $C_8H_{17}—S_{3.9}—C_8H_{17}$.

*Example 5.—Sweetened di-tert.-octyl tetrasulfide*

The procedure of Example 4 was repeated to give a product containing 34.23% S and 0.78% Cl, corresponding to the formula $C_8H_{17}—S_{3.7}—C_8H_{17}$.

*Example 6.—Di-tert.-dodecyl trisulfide*

202 g. (1 mol) of tert.-dodecyl mercaptan (prepared by reacting triisobutylene with $H_2S$) and 51.3 g. (0.5 mol) of $SCl_2$ were reacted in the presence of 200 cc. of chloroform according to the procedure of Example 1. The liquid residue contained 23.51% S and 0.65% Cl, corresponding to the formula $C_{12}H_{25}—S_{3.3}—C_{12}H_{25}$.

*Example 7.—Sweetened di-tert.-dodecyl trisulfide*

"Sweetening" of the product of Example 6 by treatment with ammonium sulfide solution as in Example 2 gave a product containing 23.83% S and 0.46% Cl, corresponding to $$C_{12}H_{25}—S_{3.3}—C_{12}H_{25}$$

*Example 8.—Di-tert.-dodecyl tetrasulfide*

202 g. (1 mol) of tert.-dodecyl mercaptan and 67.5 g. (0.5 mol) of $S_2Cl_2$ were reacted in the presence of 200 cc. of chloroform solvent according to the procedure of Example 3. The liquid residue contained 29.90% S and 0.32% Cl, corresponding to the formula $C_{12}H_{25}—S_{4.5}—C_{12}H_{25}$.

*Example 9.—Sweetened di-tert.-dodecyl tetrasulfide*

"Sweetening" of the product of Example 8 by treatment with ammonium sulfide solution as described in Example 4 gave a product containing 28.60% S and 0.35% Cl, corresponding to the formula $C_{12}H_{25}—S_{4.2}—C_{12}H_{25}$.

*Example 10.—Di-tert.-octyl trisulfide*

257.5 g. (2.5 mols) of $SCl_2$ was dropped over a period of 65 minutes into 730 g. (5 mols) of tert.-octyl mercaptan while stirring. The temperature rose to 80° C. during the addition and was kept at 75° C. for one hour and 37 minutes thereafter while air was blown through the mixture to remove HCl. After cooling, the mixture was stirred with a solution of ammonium sulfide made from 750 cc. of concentrated ammonium hydroxide of 40 g. of $H_2S$. The organic layer was extracted with petroleum ether, washed three times with water and dried over anhydrous $K_2CO_3$. The solvent was stripped off by distillation at 100° C. and 1 mm. pressure. The yellow liquid product weighed 641 g. and was slightly hazy. This haziness was removed by filtering through diatomaceous earth. Analysis showed 29.16% S and 0.41% Cl.

The following tables show by comparison the extent to which the sulfur atoms in the polysulfide products are held in the molecule in the tertiary alkyl compounds, as compared to similar compounds prepared from primary mercaptans. The primary mercaptan employed in preparing the polysulfides was "Lorol" mercaptan, which is a mixture of mercaptans of 10 to 16 carbon atoms per molecule, derived from a product obtained in the catalytic hydrogenation of cocoanut oil acids. It will be seen that, regardless of the number of sulfur atoms introduced into the original polysulfide product obtained from the Lorol mercaptan, the sweetening process reduced the number of sulfur atoms to approximately 3. On the other hand, upwards of 4 atoms of sulfur were retained in the product, derived from tert.-dodecyl mercaptan.

POLYSULFIDES FROM TERTIARY DODECYL MERCAPTAN

| Sulfur Halide | Mol Ratio of Mercaptan to Sulfur Halide | Unsweetened Polysulfide | | | Sweetened Polysulfide | | |
|---|---|---|---|---|---|---|---|
| | | Number of Sulfur Atoms per Molecule | Analyses | | Number of Sulfur Atoms per Molecule | Analyses | |
| | | | Percent S | Percent Cl | | Percent S | Percent Cl |
| $SCl_2$ | 2:1 | 3.3 | 23.51 | 0.65 | 3.3 | 23.83 | 0.46 |
| $S_2Cl_2$ | 2:1 | 4.5 | 29.90 | 0.32 | 4.2 | 28.60 | 0.35 |
| $SCl_2$ | 1:1 | 6.0 | 36.15 | 0.93 | 4.3 | 28.85 | 0.71 |
| $S_2Cl_2$ | 1:1 | 8.1 | 44.14 | 0.79 | 4.4 | 29.50 | 0.84 |

POLYSULFIDES FROM "LOROL" MERCAPTAN

| Sulfur Halide | Mol Ratio of Mercaptan to Sulfur Halide | Unsweetened Polysulfide | | | Sweetened Polysulfide | | |
|---|---|---|---|---|---|---|---|
| | | Number of Sulfur Atoms per Molecule | Analyses | | Number of Sulfur Atoms per Molecule | Analyses | |
| | | | Percent S | Percent Cl | | Percent S | Percent Cl |
| $SCl_2$ | 2:1 | 3.1 | 19.22 | 0.06 | 3.0 | 18.52 | 0.15 |
| $S_2Cl_2$ | 2:1 | 3.8 | 23.36 | 0.71 | 3.2 | 19.98 | 1.05 |
| $SCl_2$ | 1:1 | 3.7 | 21.96 | 5.37 | 3.1 | 19.44 | 1.00 |
| $S_2Cl_2$ | 1:1 | 5.2 | 28.91 | 4.86 | 3.0 | 18.71 | 1.21 |

Example 11.—Bearing corrosion tests

Blends of various tertiary-alkyl polysulfides of the present invention in a lubricating oil base were submitted to a corrosion test designed to measure the effectiveness of the products in inhibiting the corrosiveness of a typical mineral lubricating oil toward the surface of copper-lead bearings. For a comparison, blends of certain tertiary alkyl mercaptans were similarly tested. The base oil employed was a well refined solvent extracted paraffinic type mineral lubricating oil of SAE 20 viscosity grade, and each blend contained 1% of additive. The test was conducted as follows: 500 cc. of the oil was placed in a glass oxidation tube (13 inches long and 2⅜ inches in diameter) fitted at the bottom with a ¼ inch air inlet tube perforated to facilitate air distribution. The oxidation tube was then immersed in a heating bath so that the oil temperature was maintained at 325° C. during the test. Two quarter sections of automotive bearings of copper-lead alloy of known weight having a total area of 25 sq. cm. were attached to opposite sides of a stainless steel rod which was then immersed in the test oil and rotated at 600 R. P. M., thus providing sufficient agitation of the sample during the test. Air was then blown through the oil at the rate of 2 cu. ft. per hour. At the end of each 4-hour period the bearings were removed, washed with naphtha and weighed to determine the amount of loss by corrosion. The bearings were then repolished (to increase the severity of the test), reweighed, and then subjected to the test for additional 4-hour periods in like manner. The results are given in the following table as "corrosion life," which indicates the number of hours required for the bearings to lose 100 mg. in weight, determined by interpolation of the data obtained in the various periods.

| Additive | Bearing Corrosion Life (Hrs.) |
|---|---|
| None | 6 |
| Tert.-octyl mercaptan | 14 |
| Tert.-dodecyl mercaptan | 16 |
| Di-"Lorol" disulfide | 11 |
| Di-tert.-octyl disulfide | 40 |
| Di-tert.-dodecyl disulfide | 40 |
| Di-tert.-octyl trisulfide (product of Ex. 2) | 48 |
| Di-tert.-octyl tetrasulfide (product of Ex. 5) | 48 |
| Di-tert.-dodecyl trisulfide (product of Ex. 6) [1] | 23 |
| Di-tert.-dodecyl trisulfide (product of Ex. 7) [1] | 32 |
| Di-tert.-dodecyl tetrasulfide (product of Ex. 9) [1] | 50 |
| Di-tert.-dodecyl hexasulfide [2] | 50 |
| Di-tert.-dodecyl octasulfide [2] | 57 |
| None | 10 |
| Di-n-butyl disulfide | 2 |
| Di-n-amyl disulfide | 11 |

[1] Blackens copper strip at 212° F. after 3 hours.
[2] Blackens copper strip at 212° F. after ½ hour.
All other blends did not blacken copper strip in 3 hours.

The above data indicate that the tertiary alkyl polysulfides are distinctly superior to the corresponding mercaptans and to the primary dialkyl disulfide as corrosion inhibiting agents. It is further shown in the table that a number of unsweetened products showed a tendency to stain metallic surfaces, illustrated by the copper strip test, while other products, chiefly sweetened products, were free from this tendency. This shows the possibility of preparing additives containing a considerable proportion of sulfur but without the objectionable staining tendency.

Further bearing corrosion tests were made to determine the effect of the presence of a detergent, e. g., calcium sulfonate, on the inhibiting power of the additive.

Example 12.—Bearing corrosion tests with detergent

Blends containing 1% each of examples of tertiary alkyl tetrasulfides, both with and without the further addition of calcium sulfonate, were tested by the method described in Example 11, using as a base stock the same lubricating oil. Similar tests were made with a commercial corrosion inhibitor, sold under the trade name "Paranox 12." The results are as follows:

| Additive | Bearing Corrosion Life | | |
|---|---|---|---|
|  | Without Calcium Sulfonate | With 1% Calcium Sulfonate | Difference |
| None | 6 | 5 | 1 |
| "Paranox 12" | 45 | 24 | 21 |
| Di-tert.-octyl tetrasulfide | 46 | 42 | 4 |
| Di-tert.-dodecyl tetrasulfide | 39 | 32 | 7 |

The above results show that the dialkyl tetrasulfides are not appreciably affected by the presence of calcium sulfonate. They are accordingly highly suitable as corrosion inhibiting agents when used in the presence of a detergent.

The additives of the present invention have been found to be highly effective in promoting cleanliness in an engine in which the base lubricating oil is employed as a crankcase lubricant. This property is illustrated by the data of the following example.

Example 13.—Chevrolet engine test

In this test a base oil was used which consisted of a solvent extracted Mid-Continent paraffinic oil of 46 seconds Saybolt viscosity at 210° F. and 110 V. I., to which had been added sufficient polybutene V. I. improver to give a lubricating oil of 125 V. I. and 52 seconds viscosity at 210° F. An unblended sample of this base oil and a sample of the oil containing 1% of di-tert.-octyl trisulfide, prepared as described in Example 10, were tested in a Chevrolet engine run for 36 hour periods under the following conditions: 14.2/1 air/fuel ratio, 30 brake horse power, 3150 R. P. M., 280° F. oil temperature, 200° F. water jacket temperature. After each engine test was completed the engine parts were examined and given demerit ratings based on their condition, particular attention being paid to the ring zone conditions. The individual ratings were weighted according to their relative importance and an overall demerit rating calculated from them. It should be pointed out that the lower the demerit rating the better the engine condition, and hence the better the performance of the oil. The results obtained are presented in the table below:

| Oil Sample | Engine Demerits | | |
|---|---|---|---|
|  | Overall | Piston Skirt Varnish | Cu-Pb Weight Loss (g.) |
| Base Oil | 1.9 | 4.1 | 3.2 |
| Base Oil +1% di-tert.-octyl trisulfide | 0.75 | 2.08 | 1.56 |

It will be seen that the additive produced a marked improvement in the engine condition.

The additives of the present invention have also been found to be highly effective as extreme pressure agents, i. e., agents for increasing the load carrying capacity of a lubricating oil. This property is illustrated in the following example.

Example 14.—Tests of load carrying properties

To determine the load carrying properties of oils containing various examples of the additives of the present invention, blends were prepared containing 10% of various compounds in a gear oil consisting of a mixture of a steam refined Pennsylvania cylinder oil and a light paraffinic Mid-Continent distillate oil, and such blends were tested in the standard SAE Test Machine, which was operated at 1000 R. P. M. and 14.6/1 slip ratio. The results are as follows:

| Additive | S. A. E. Machine Scale Rating |
|---|---|
| None | <20 |
| Di-n-amyl disulfide | 170 |
| Di-"Lorol" disulfide | 110 |
| Di-"Lorol" trisulfide | 180 |
| Di-tert.-octyl disulfide | 320 |
| Di-tert.-dodecyl disulfide | 195 |
| Di-tert.-octyl trisulfide | >450 |
| Di-tert.-dodecyl trisulfide | >450 |
| Di-tert.-octyl tetrasulfide [1] | >450 |
| Di-tert.-dodecyl tetrasulfide [1] | >450 |
| Di-tert.-dodecyl hexasulfide [1] | >450 |
| Di-tert.-dodecyl octasulfide [1] | >450 |

[1] These oil blends were found to blacken a copper strip when contacted for one hour at 212° F., while all other blends fail to blacken the copper strip.

It is obvious from the above data that the tertiary alkyl polysulfides are distinctly superior to the primary alkyl disulfides as extreme pressure agents.

The additives of the present invention when employed in mineral lubricating oils as corrosion inhibitors are advantageously used in proportions of from 0.1 to 2.0%, and when employed as extreme pressure agents the proportion will be advantageously from 2 to 10% or higher.

Although the tertiary alkyl polysulfides of the present invention may be employed as the sole additives in lubricating compositions, their use in conjunction with other materials, particularly with detergent type additives, will often be found advantageous. It is thus contemplated to use these compounds in lubricating compositions containing such other addition agents as metal phenates, metal alkyl phenol sulfides, metal organo-phosphates, thiophosphates, phosphites and thiophosphites, metal alcoholates and ketonates, metal sulfonates, metal carboxylates, metal phosphonates, metal xanthates and thioxanthates, metal thiocarbamates, and the like.

Thus, the addition agents of the present invention may be used in mineral lubricating oils containing one or more of the following representative materials:

Barium tert.-octyl phenol sulfide
Calcium mahogany sulfonates
Calcium dichlorostearate
Nickel amyl xanthate
Aluminum naphthenate
Zinc methyl cyclohexyl dithiophosphate
Tin salt of wax alkylated phenol sulfide
Barium octadecylate
Magnesium cetyl phenate
Barium diamyl phenol sulfide
Zinc diisopropyl salicylate
Calcium cetyl phosphate The lubricating oil base stocks employed in the blended lubricating oils of this invention may be straight mineral lubricating oils, or distillates derived from paraffinic, naphthenic, asphaltic or mixed base crudes, or, if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced, for example, by solvent extraction with solvents of the type of phenol, sulfur dioxide, furfural, dichloroethyl ether, propane, nitrobenzene, crotonaldehyde, etc. Hydrogenated oils or white oils may be employed as well as synthetic oils prepared, for example, by the polymerization of olefins or by the reaction of oxides of carbon with hydrogen or by the hydrogenation of coal or its products. In certain instances cracking coil tar functions and coal tar or shale oil distillates may also be used. Also, for special applications, animal, vegetable or fish oils or their hydrogenated or voltolized products may be employed, either alone or in admixture with mineral oils.

For the best results the base stock chosen should normally be that oil which without the new additive present gives the optimum performance in the service contemplated. However, since one advantage of the additives is that their use also makes feasible the employment of less satisfactory mineral oils or other oils, no strict rule can be laid down for the choice of the base stock. Certain essentials must of course be observed. The oil must possess the viscosity and volatility characteristics known to be required for the service contemplated. The oil must be a satisfactory solvent for the additive, although in some cases auxiliary solvent agents may be used. The lubricating oils, however they may have been produced, may vary considerably in viscosity and other properties depending upon the particular use for which they are desired, but they usually range from about 40 to 150 seconds Saybolt viscosity at 210° F. For the lubrication of certain low and medium speed diesel engines the general practice has often been to use a lubricating oil base stock prepared from naphthenic or aromatic crudes and having a Saybolt viscosity at 210° F. of 45 to 90 seconds and a viscosity index of 0 to 50. However, in certain types of diesel service, particularly with high speed diesel engines, and in gasoline engine service, oils of higher viscosity index are often required, for example up to 75 or 100, even higher, viscosity index.

In addition to the materials to be added according to the present invention, other agents may also be used such as dyes, pour depressors, heat thickened fatty oils, sulfurized fatty oils, organo-metallic compounds, metallic or other soaps, sludge dispersers, antioxidants, thickeners, viscosity index improvers, oiliness agents, resins, rubber, olefin polymers, voltolized fats, voltolized mineral oils, and/or voltolized waxes and colloidal solids such as graphite or zinc oxide, etc. Solvents and assisting agents, such as esters, ketones, alcohols, aldehydes, halogenated or nitrated compounds and the like, may also be employed.

Assisting agents which are particularly desirable are the higher alcohols having eight or more carbon atoms and preferably 12 to 20 carbon atoms. The alcohols may be saturated straight and branched chain aliphatic alcohols such as octyl alcohol, $C_8H_{17}OH$, lauryl alcohol, $C_{12}H_{26}OH$, cetyl alcohol, $C_{16}H_{33}OH$, stearyl alcohol, sometimes referred to as octadecyl alcohol, $C_{18}H_{37}OH$, and the like; the corresponding olefinic alcohols such as oleyl alcohol; cyclic alcohols, such as naphthenic alcohols; and aryl substituted alkyl alcohols, for instance, phenyl octyl alcohol, or octadecyl benzyl alcohol, or mixtures of these various alcohols, which may be pure or substantially pure synthetic alcohols. One may also use mixed naturally occurring alcohols such as those found in wool fat (which is known to contain a substantial percentage of alcohols having about 16 to 18 carbon atoms) and in sperm oil (which contains a high percentage of cetyl alcohol); and although it is preferable to isolate the alcohols from those materials, for some purposes the wool fat, sperm oil or other natural products rich in alcohols may be used per se. Products prepared synthetically by chemical processes may also be used, such as alcohols prepared by the oxidation of petroleum hydrocarbons, e. g., paraffin wax, petrolatum, etc.

In addition to being employed in crankcase lubricants and in extreme pressure lubricants, the additives of the present invention may also be used in industrial lubricants, process oils, engine flushing oils, turbine oils, insulating and transformer oils, steam cylinder oils, slushing and rust preventing compositions and greases. Also their use in motor fuels, diesel fuels and kerosene is contemplated. The particular effectiveness of the additives as ignition promoters in diesel fuels is illustrated by tests of cetane number improvement resulting from the addition of the additives under discussion. The conditions of the tests are described in the following example, wherein it is shown that the cetane number of the fuel is markedly increased by adding compounds of the present invention. The higher polysulfides are more effective than the lower polysulfides, the tetrasulfides being particularly effective. The primary dialkyl tetrasulfides heretofore known in the art have been too corrosive to copper to be useful as an additive for the fuel. The tertiary dialkyl tetrasulfides of this invention, especially after being sweetened, have an excellent capacity for raising the cetane number of the diesel fuel, the resulting fuel being non-corrosive to copper and having excellent storage stability.

*Example 15.—Diesel fuel tests*

Cetane number determinations were made with an unblended high speed diesel fuel of 50 cetane number, consisting of a major proportion of virgin gas oils with not more than 25% of cracked gas oil, and with this base fuel containing 1% of various additives of the present invention. The results are as follows:

| Additive | Cetane Number | Cetane Number Increase |
|---|---|---|
| None | 50 | |
| Tert.-octyl mercaptan | 51 | 1 |
| Di-tert.-octyl disulfide | 55 | 5 |
| Di-tert.-octyl trisulfide | 57 | 7 |
| Di-tert.-octyl tetrasulfide | 60 | 10 |

All of the above fuels were found to pass the three hour copper strip corrosion test at 212° F.

In addition to the uses described above, the compounds of the present invention are likewise useful as plasticizers in rubbers, as sulfur carrying compounds (vulcanizing agents) for rubber and similar products, and as stabilizing agents for hydrocarbon polymers.

The present invention is not to be considered as limited by any of the examples described herein, which are given by way of illustration only but are to be limited solely by the terms of the appended claims.

I claim:

1. A hydrocarbon diesel fuel containing an ignition-promoting amount of a dialkyl sulfide having tertiary alkyl radicals of from 8 to 25 carbon atoms and having 4–8 sulfur atoms linking the respective tertiary alkyl radicals.

2. A hydrocarbon diesel fuel according to claim 1 in which the dialkyl sulfide has 4 sulfur atoms linking the respective tertiary alkyl radicals.

3. A hydrocarbon diesel fuel according to claim 1 in which the dialkyl sulfide is di-tertiary octyl tetrasulfide.

LAWRENCE T. EBY.

REFERENCES CITED

The following references are of record in the file of this patent:

UNITED STATES PATENTS

| Number | Name | Date |
|---|---|---|
| 2,374,983 | De Simó | May 1, 1945 |
| 2,415,852 | Schulze et al. | Feb. 18, 1947 |
| 2,526,041 | Olin | Oct. 17, 1950 |